United States Patent [19]
Endo

[11] Patent Number: 4,884,491
[45] Date of Patent: Dec. 5, 1989

[54] PNEUMATIC BOOSTER

[75] Inventor: Mitsuhiro Endo, Ebina, Japan

[73] Assignee: Tokico Ltd., Kanagawa, Japan

[21] Appl. No.: 181,425

[22] Filed: Apr. 14, 1988

[30] Foreign Application Priority Data

Apr. 15, 1987 [JP] Japan .................................. 62-92787

[51] Int. Cl.$^4$ .............................................. F15B 9/10
[52] U.S. Cl. .................................. 91/369.2; 91/376 R
[58] Field of Search ................ 91/369.1, 369.2, 369.3, 91/369.4, 376 R, 392, 393, 410, 419

[56] References Cited

U.S. PATENT DOCUMENTS 4,752,055  2/1986  Schiel ................................. 91/369.2

FOREIGN PATENT DOCUMENTS

| 3222929A1 | 1/1983 | Fed. Rep. of Germany . |
| 3330481A1 | 3/1985 | Fed. Rep. of Germany . |
| 3413739 | 10/1985 | Fed. Rep. of Germany ..... 91/369.1 |
| 61-64074 | 5/1986 | Japan . |

Primary Examiner—Robert E. Garrett
Assistant Examiner—Mark A. Williamson
Attorney, Agent, or Firm—Wenderoth, Lind & Ponack

[57] ABSTRACT

A pneumatic booster includes a casing, a diaphragm secured to the casing to partition the inside of the casing into a front chamber which is communicated with a negative-pressure source and a rear chamber, a valve body secured to the inner peripheral portion of the diaphragm, a vacuum valve provided in the valve body to allow the front and rear chambers to be selectively communicated with and cut off from each other, an atmospheric valve provided in the valve body to allow the rear chamber to be selectively communicated with and cut off from the atmosphere, an input rod for actuating the vacuum and atmospheric valves, and an output rod adapted to receive the force of displacement of the diaphragm. The atmospheric valve is composed of first and second valve portions provided in series along a communicating passage between the rear chamber and the atmosphere. The first and second valve portions are closed successively in the mentioned order when the atmospheric valve is closed. The booster further includes orifices for providing communication between the rear chamber and the atmosphere during the period of time from the instant the first valve portion is closed until the second valve portion is closed. Thus, it is possible to give a driver a feeling of stable and favorable braking at all times and also to improve the durability of the booster.

19 Claims, 5 Drawing Sheets

PNEUMATIC BOOSTER

BACKGROUND OF THE INVENTION:

1. Field of the Invention

The present invention relates to a pneumatic booster for use in a brake system of an automobile or the like. More particularly, the present invention pertains to a pneumatic booster for use in, for example, an automotive brake system, which is so designed that it has the ability to give a driver a feeling of stable and favorable braking when the brake pedal of such a brake system is actuated.

2. Description of the Related Art

Generally speaking, in a brake system which is provided with a pneumatic booster, as the brake pedal is pressed down, the output rises in proportion to the pressing force (i.e., input force). It has been known that the driver is given a feeling of stable and favorable braking if the brake system is arranged such that, when the driver stops pressing down the brake pedal at a halfway stage (i.e., in an intermediate load state), the output is increased at a rate higher than the rate which is usually obtained in the above-described proportional relationship to the input. More specifically, when the brake is activated, a large quantity of heat is generated at the area of contact between the brake shoe and the brake drum and therefore the temperature rises to a high level, thus causing a lowering of the coefficient of friction. Accordingly, even if the brake pedal is maintained at a certain pressed position with a constant level of force, the braking efficiency deteriorates. For this reason, if the brake system is arranged such that the output is further increased even after the driver has stopped pressing down the brake pedal, it is possible to give a feeling of stable and favorable braking.

Japanese Utility Model Public Disclosure (Kokai) No. 61-64074 (1986) discloses a pneumatic booster which is designed to enable the above-described braking characteristics to be obtained.

Referring to FIGS. 12 and 13, the prior art comprises a plunger 2 which is movable in response to the movement of an input shaft 1, a first valve seat 4 formed on a valve body 3, a second valve seat 5 formed on the plunger 2, and a valve member 6 which is selectively separated from and seated on the first valve seat 4 to thereby allow a constant-pressure chamber (not shown) and a variable-pressure chamber (not shown) to be communicated with and cut off from each other, the valve member 6 also being selectively separated from and seated on the second valve seat 5 to thereby allow the variable-pressure chamber to be communicated with and cut off from the atmosphere. The valve member 6 is formed from an elastic material, for example, rubber, and orifices 6a are formed in the valve member 6 such that flow passages defined by the orifices 6a are cut off by virtue of the elastic deformation of the valve member 6 when seated on the second valve seat 5.

In operation, when the brake pedal (not shown) is pressed down, the input shaft 1 advances, and the valve member 6 is thereby seated on the first valve seat 4, thus causing the constant- and variable-pressure chambers to be cut off from each other. At this time, the second valve seat 5 separates from the valve member 6, and atmospheric air is thereby introduced into the variable-pressure chamber to effect a boosting operation.

If the driver stops pressing down the brake pedal at a halfway point (i.e., an intermediate load state), the advancement of the plunger 2 is suspended, while the valve body 3 is advanced, and the valve member 6 comes into contact with the second valve seat 5. At this time, the variable-pressure chamber is communicated with the atmosphere through the orifices 6a formed in the valve member 6. As a result, the valve body 3 is gradually advanced by the action of the atmospheric air which is supplied through the orifices 6a at a relatively low flow rate, thus increasing the output. As the valve body 3 is gradually advanced, the valve member 6 is pressed against the second valve seat 5 with a force which is gradually intensified, and the valve member 6 is eventually elastically deformed to close the orifices 6a. As a result, the communication between the variable-pressure chamber and the atmosphere is cut off, and the advancement of the valve body 3 is thus suspended.

In this way, when the advancement of the input shaft 1 is suspended in an intermediate load state, the output is increased at a higher rate than the rate which is obtained when the usual proportional relationship applies, thereby giving a feeling of stable and favorable braking to the driver.

The conventional pneumatic booster suffers, however, from the following problems.

Since the orifices 6a are formed in an elastic material, for example, rubber, and they are opened and closed by making use of the elastic deformation of the elastic material, the timing at which the orifices 6a are opened or closed changes in accordance with the hardness of the elastic material. More specifically, since the hardness of the elastic material varies with any change in the air temperature and also lowers with time, it is impossible to obtain stable braking characteristics at all times.

The portion of the valve member 6 where the orifices 6a are formed is readily deteriorated because of the repetitive elastic deformation, and therefore the prior art suffers from inferior durability.

SUMMARY OF THE INVENTION:

In view of the above-described problems of the prior art, it is a primary object of the present invention to provide a pneumatic booster which is designed to give a driver a feeling of stable and favorable braking and which also exhibits stable braking characteristics and improved durability.

To this end, the present invention provides a pneumatic booster including a casing, a diaphragm secured to the casing to partition the inside of the casing into a front chamber which is communicated with a negative-pressure source and a rear chamber, a valve body secured to the inner peripheral portion of the diaphragm, a vacuum valve provided in the valve body to allow the front and rear chambers to be selectively communicated with and cut off from each other, an atmospheric valve provided in the valve body to allow the rear chamber and the atmosphere to be selectively communicated with and cut off from each other, an input rod for actuating the vacuum and atmospheric valves, and an output rod receiving the force of displacement of the diaphragm, wherein the improvement comprises: the atmospheric valve which is composed of first and second valve portions provided in series along a communicating passage between the rear chamber and the atmosphere, the first and second valve portions being closed successively in the mentioned order when the atmospheric valve is closed; and orifice means for providing communication between the rear chamber and the atmosphere during the period of time from the instant the first valve portion is closed until the second valve portion is closed.

When the driver stops pressing down the brake pedal halfway, the advancement of the plunger is suspended, while the valve body is advanced. Accordingly, the first valve portion provided at the rear-end portion of the plunger is closed by a poppet valve member, so that the variablepressure chamber and the atmosphere are communicated with each other through the orifices alone. As a result, the valve body is gradually advanced to increase the output. When the valve body is further advanced, the second valve portion is seated on the front end face of the poppet valve member. In consequence, the communication between the variable-pressure chamber and the atmosphere is completely cut off, and the increase of output is thus suspended. With this output control, it is possible to give the driver a feeling of stable and favorable braking when he stops pressing down the brake pedal in a intermediate load state.

Since the orifices are opened and closed by closing the first valve portion with the poppet valve member and seating the second valve portion on the poppet valve member, the hardness of the poppet valve member has no effect on the timing at which the orifices are opened or closed. In addition, since no heavy load is repeatedly applied to the poppet valve member from the valve portions, there is no fear of its deterioration occurring because of overloading.

BRIEF DESCRIPTION OF THE DRAWINGS:

The above and other objects, features and advantages of the present invention will become more apparent from the following description of the preferred embodiments thereof, taken in conjunction with the accompanying drawings, in which like reference numerals denote like elements, and in which.

Figure 1:
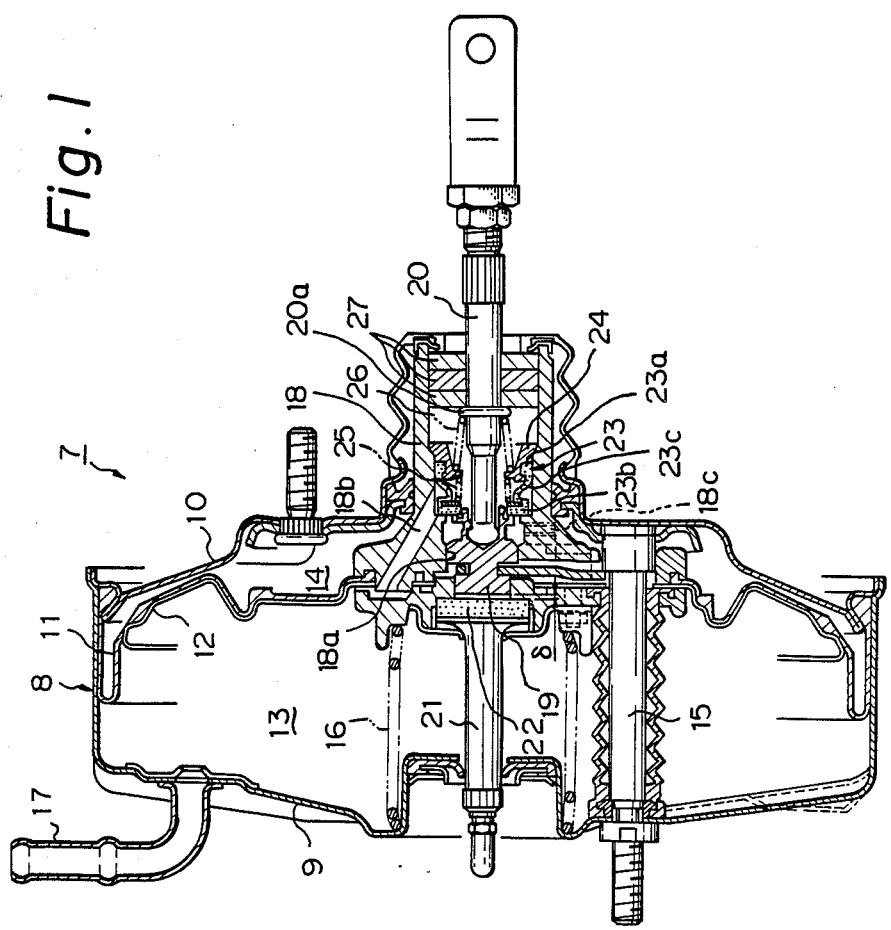
FIG. 1 is a sectional view of one embodiment of the pneumatic booster according to the present invention.

DESCRIPTION OF THE PREFERRED EMBODIMENTS:

Preferred embodiments of the present invention will be described hereinunder in detail with reference to the accompanying drawings.

FIGS. 1 to 4 show in combination a pneumatic booster 7 in accordance with a first embodiment of the present invention.

The pneumatic booster 7 has a casing 8 which consists of a front shell 9 and a rear shell 10. The inside of the casing 8 is partitioned by a diaphragm 11 and a power piston 12 into a negative-pressure chamber 13 and a variable-pressure chamber 14 which are defined as front and rear chambers, respectively. The diaphragm 11 and the power piston 12 are movable longitudinally through a guide rod 15. When the booster 7 is in an inoperative state, the diaphragm 11 and the power piston 12 are held at the rearward position by means of the biasing force of a return spring 16 provided within the negative-pressure chamber 13. It should be noted that a negative-pressure inlet pipe 17 which is communicated with a negative-pressure source (not shown), for example, an intake manifold, is secured to the outer wall of the negative-pressure chamber 13 such that the inlet pipe 17 is communicated with the chamber 13.

A valve body 18 is provided inside the casing 8, the valve body 18 having one end thereof secured to both the diaphragm 11 and the power piston 12 and the other end thereof projecting to the outside from the rear end of the casing 8. The valve body 18 has a cylindrical configuration, and a cylinder portion 18a is axially formed at the front end of the valve body 18. A plunger 19 is slidably fitted in the cylinder portion 18a, and an input shaft 20 is connected to the rear end of the plunger 19. An output shaft 21 is provided in such a manner that the rear end of the shaft 21 faces the front end of the plunger 19. The output shaft 21 is connected to the valve body 18 through a reaction disk 22.

A poppet valve member 23 is provided inside the valve body 18. The rear end portion 23a of the poppet valve member 23 is rigidly secured to the inner periphery of the valve body 18 through a spring retainer 24. The front end portion 23b of the poppet valve member 23 is allowed to advance and retract longitudinally by virtue of a bellows structure defined by an intermediate portion 23c of the valve member 23. The front end portion 23b is biased forward by a spring 25 which is disposed between the same and the spring retainer 24. It should be noted that a spring 26 which is disposed between the spring retainer 24 and flange 20a of the input shaft 20 biases the shaft 20 rearward.

The valve body 18 is provided with a passage 18b for providing communication between the negative-pressure chamber 13 and the inside of the valve body 18 and a passage 18c for providing communication between the variable-pressure chamber 14 and the inside of the valve body 18. The inside of the valve body 18 is communicated with the atmosphere through a filter 27 which is provided at the rear end portion of the valve body 18.

Figure 2:
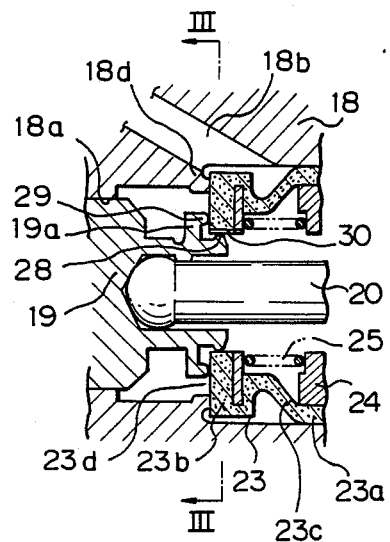
FIG. 2 is an enlarged view of a part of the pneumatic booster shown in FIG. 1.
Figure 3:
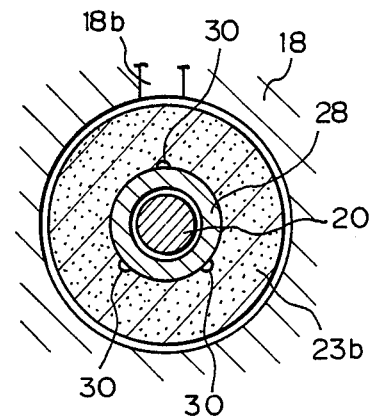
FIG. 3 is a sectional view taken along the line III—III of FIG. 2.

As shown in FIG. 2 in detail, the valve body 18 has a valve seat 18d formed on its inner peripheral surface such that the poppet valve member 23 is capable of being seated on the valve seat 18d. The poppet valve member 23 and the valve seat 18d constitute in combination a vacuum valve. When the front end portion 23b of the poppet valve member 23 is seated on the valve seat 18d, the passage 18b is closed, and the communication between the negative-pressure chamber 13 and the inside of the valve body 18 is thereby cut off. In consequence, the communication between the negative-pressure chamber 13 and the variable-pressure chamber 14 is cut off. Further, a first valve portion 28 and a second valve portion 29 are provided at the rear end portion of the plunger 19. The first and second valve portions 28, 29 and the poppet valve member 23 constitute in combination an atmospheric valve. The first valve portion 28 is formed on the outer periphery of the rear end portion of the plunger 19. The dimensions of the first valve portion 28 are so determined that it is capable of slidably fitting against the inner periphery of the front end portion 23b of the poppet valve member 23. The second valve portion 29 is formed on a flange 19a which extends radially outward from the rear end portion of the plunger 19 at a position forward of the first valve portion 28. The second valve portion 29 is arranged such that it is capable of being seated on the end face 23d of the front end portion 23b of the poppet valve member 23. In addition, three longitudinal grooves 30, or orifices, are formed in the inner peripheral portion of the poppet valve member 23 which is brought into fitting contact with the first valve portion 28, the orifices 30 being circumferentially spaced apart from each other (see FIG. 3).

The following is a description of the operation of the above-described arrangement.

FIG. 1 shows the pneumatic booster in an inoperative state. If, in this state, a brake pedal (not shown) is pressed down, the input shaft 20 advances while moving the plunger 19 forward, thus causing the plunger 19 to separate from the poppet valve member 23, as shown in FIG. 4(a). In consequence, the inside of the valve body 18 is communicated with the variable-pressure chamber 14 through the passage 18c, and atmospheric air is thereby introduced into the variable-pressure chamber 14, which results in a pressure difference between the negative-pressure chamber 13 and the variable-pressure chamber 14. Thus, the diaphragm 11 and the power piston 12 are moved forward by the differential pressure against the resilient force of the return spring 16, and boosted force is thereby transmitted to the output shaft 21.

Figure 4:
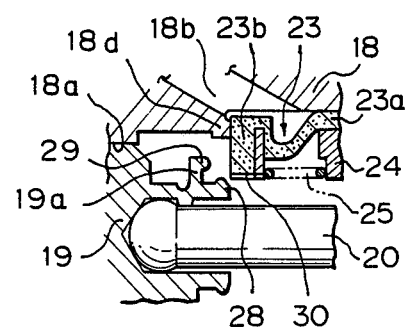
FIGS. 4(a) and 4(b) are fragmentary enlarged sectional views showing the operation of the pneumatic booster shown in FIG. 1.
Figure 4B:
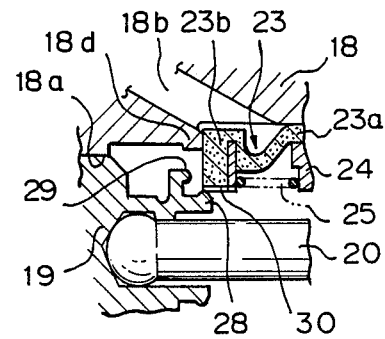

If the driver stops pressing down the brake pedal halfway (i.e., in an intermediate load state) and maintains this pedal position, the advancement of the input shaft 20 is suspended, while the valve body 18 advances, and the first valve portion 28 of the plunger 19 is therefore fitted against the inner periphery of the poppet valve member 23 [see FIG. 4(b)]. At this time, the second valve portion 29 has not yet been seated on the front end face 23d of the poppet valve member 23. Therefore, atmospheric air is still introduced into the variable-pressure chamber 14 at a relatively low flow rate through the orifices 30 formed in the poppet valve member 23 and also through the clearance between the poppet valve member 23 and the second valve portion 29, so that the output alone is still increased. This increase in the output prevents lowering of the braking efficiency and gives the driver a feeling of stable and favorable braking.

As the atmospheric air is introduced into the variable-pressure chamber 14 at a relatively low flow rate as described above, the valve body 18 advances, and the second valve portion 29 of the plunger 19 is eventually seated on the front end face 23d of the poppet valve member 23, thereby completely cutting off the communication between the variable-pressure chamber 14 and the atmosphere, and thus suspending the advancement of the valve body 18 (see FIG. 2).

If the brake pedal is further pressed down from the suspended position, the plunger 19 further advances to allow atmospheric air to be introduced into the variable-pressure chamber 14, so that boosted force is transmitted to the output shaft 21. If the driver stops pressing down the brake pedal halfway again, the above-described operation is repeated.

If the brake pedal is released from the suspended position, the input shaft 20 is moved backward by the action of the spring 26, and the plunger 19 is also moved backward in response to the movement of the input shaft 20, causing the poppet valve member 23 to separate from the valve seat 18d of the valve body 18, and thus allowing the negative-pressure chamber 13 and the variable-pressure chamber 14 to communicate with each other. As a result, the difference in pressure between these chambers 13 and 14 decreases, and the diaphragm 11 and the power piston 12 are therefore moved backward by the action of the return spring 16. Thus, the booster is returned to its initial position, that is, the inoperative state shown in FIG. 1.

Figure 11:
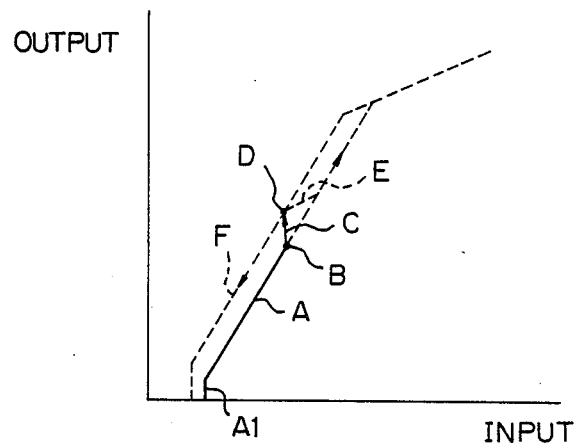
FIG. 11 is a graph showing the braking characteristics of a brake system which employs the pneumatic booster according to the present invention.
Figure 12:
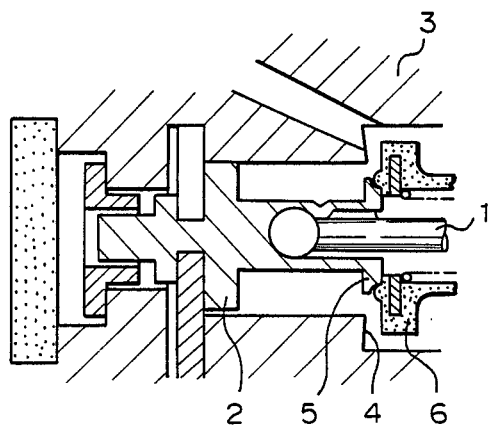
FIG. 12 is a sectional view of an essential part of a conventional pneumatic booster designed to give a driver a feeling of stable and favorable braking.
Figure 13:
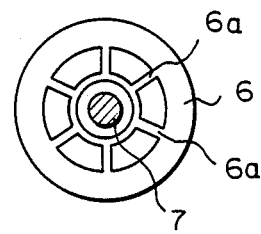
FIG. 13 is a front view of the valve member employed in the pneumatic booster shown in FIG. 12.

The above-described braking characteristics will next be explained with reference to FIG. 11.

If the brake pedal is pressed down when the pneumatic booster is in an inoperative state, the input shaft 20 is advanced, and a jump-up action is caused by the presence of the gap δ between the plunger 19 and the reaction disk 22, resulting in a rise in the output independently of the input, as shown by the line A1. When the gap δ has been reduced adequately for the plunger 19 to receive the reaction force from the reaction disk 22, the input and the output rise in proportional relationship to each other, as shown by the line A.

If the driver stops pressing down the brake pedal halfway, the first valve portion 28 provided on the plunger 19 is fitted against the inner periphery of the front end portion 23b of the poppet valve member 23, and atmospheric air is thereafter introduced into the variable-pressure chamber 14 through the orifices 30. As a result, the output alone rises as shown by the line C from the point B where the driver has stopped pressing down the brake pedal. When the second valve portion 29 comes into contact with the poppet valve member 23, the advancement of the valve body 18 is suspended, and there is therefore no possibility of the output rising above the point D.

If the brake pedal is further pressed down, the relationship between the input and the output changes as shown by the line in correspondence with the speed at which the brake pedal is pressed down, and thereafter, the output rises along the above-described line A. If the driver releases the brake pedal after he stops pressing it down, as the input shaft 20 is moved backward by the action of the spring 26, the gap δ between the plunger 19 and the reaction disk 22 is enlarged, and the reaction force therefore decreases. Accordingly, the output lowers along the line F.

Other embodiments of the present invention will next be described with reference to FIGS. 5 to 10 which show the respective essential parts of these embodiments. Since the general arrangement of these embodiments is the same as that of the above-described embodiment, only those portions which are different from the first embodiment will be explained in detail.

Figure 5:
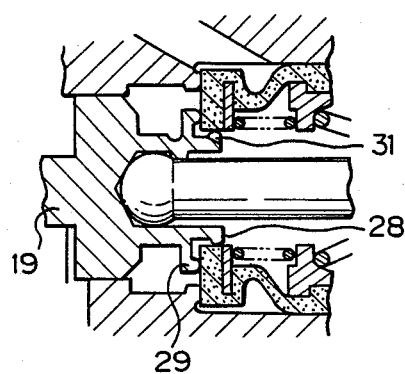
FIGS. 5 to 10 are enlarged sectional views respectively showing essential parts of other embodiments of the present invention.

According to the embodiment shown in FIG. 5, the first valve portion 28 of the plunger 19 is provided with a plurality of notches which are circumferentially spaced apart from each other to define orifices 31.

Figure 6:
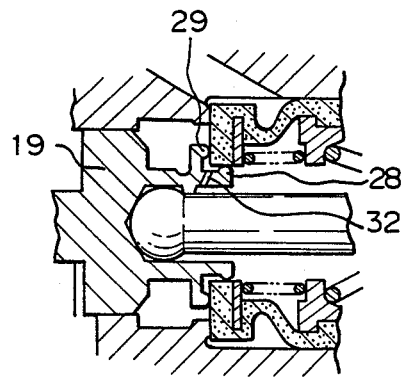

In the embodiment shown in FIG. 6, a bore is provided between the first and second valve portions 28, 29 of the plunger 19, the bore extending substantially radially, to define an orifice 32.

Figure 7:
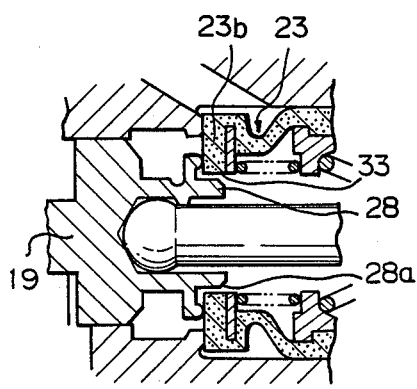

In the embodiment shown in FIG. 7, the first valve portion 28 provided on the plunger 19 is loosely fitted to the inner periphery of the front end portion 23b of the poppet valve member 23 so that a clearance which is provided between the poppet valve member 23 and the first valve portion 28 is defined as an orifice 33. When the end face of the front end portion 23b of the poppet valve member 23 coincides with the largest-diameter portion 28a at the rear end of the tapered portion of the first valve portion 28, the first valve portion 28 is closed by the poppet valve member 23.

Figure 8:
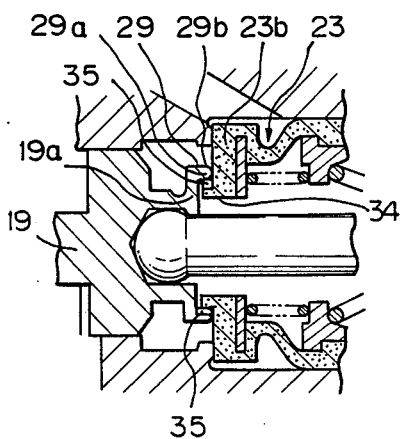

In the embodiment shown in FIG. 8, a forwardly extending projection 34 is formed along the inner periphery of the front end portion 23b of the poppet valve member 23, and a rearwardly extending annular projection 29 is formed along the outer peripheral portion of the flange 19a provided at the rear end of the plunger 19. The first valve portion is defined by the inner peripheral surface 29a of the projection 29, while the second valve portion is defined by the distal end portion 29b of the projection 29. The first valve portion 29a is adapted to be fitted against the outer periphery of the projection 34. Either the outer periphery of the projection 34 or the inner periphery of the first valve portion 29a is partially notched to define an orifice 35. For simplification, the upper part of FIG. 8 shows the arrangement wherein the outer periphery of the projection 34 is notched, while the lower part of FIG. 8 shows the arrangement wherein the inner periphery of the first valve portion 29a is notched.

Figure 9:
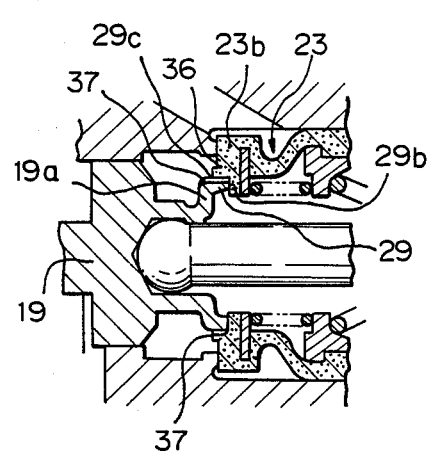

In the embodiment shown in FIG. 9, a step portion 36 is formed at the inner side of the front end portion 23b of the poppet valve member 23, and a rearwardly extending annular projection 29 is formed along the outer peripheral portion of the flange 19a provided at the rear end of the plunger 19. The first valve portion is defined by the outer peripheral surface 29c of the projection 29, while the second valve portion is defined by the distal end portion 29b of the projection 29. The first valve portion 29c is adapted to be fitted to the inner periphery of the step portion 36. Either the inner periphery of the step portion 36 or the outer periphery of the first valve portion 29c is partially notched to define an orifice 37. For simplification, the upper part of FIG. 9 shows the arrangement wherein the outer periphery of the first valve portion 29c is notched, while the lower part of FIG. 9 shows the arrangement wherein the inner periphery of the step portion 36 is notched.

Figure 10:
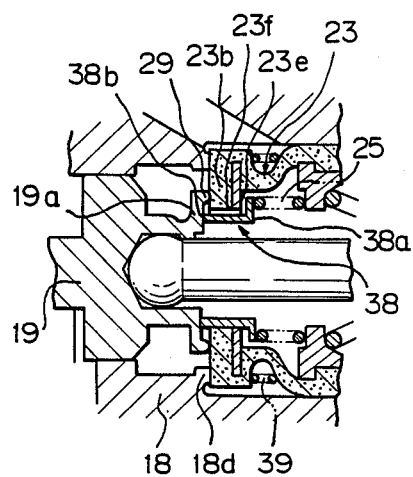

In the embodiment shown in FIG. 10, an annular valve member 38 is slidably disposed along the inner periphery of the poppet valve member 23 so as to function in the same way as the first valve portion 28 provided on the plunger 19 in the first embodiment. More specifically, when the plunger 19 is pushed leftward as viewed in FIG. 10, the valve member 38 is moved leftward along the inner periphery of the poppet valve member 23 by means of the force of the spring 25, and the front end face of the flange portion 38a of the valve member 38 comes into contact with the rear end face 23e of the poppet valve member 23. At this time, the front end portion 38b of the valve member 38 projects forward from the front end face of the poppet valve member 23. In this state, the valve member 38 moves leftward together with the valve body 18 moving leftward. When the driver stops pressing down the brake pedal and the advancement of the plunger 19 is suspended, the front end face of the valve member 38 abuts against the flange 19a of the plunger 19, and the movement of the valve member 38 is thereby blocked. However, the valve body 18 continues moving forward, and the rear end face 23e of the poppet valve member 23 separates from the front end face of the flange 38a of the valve member 38. Since a groove 23f is formed in the inner peripheral surface of the poppet valve member 23, the air still flows in through the groove 23f, so that the valve body 18 continues to move forward until the front end portion 23b of the poppet valve member 23 comes into contact with the rearwardly extending annular projection 29 formed on the flange 19a. It should be noted that a groove which serves as an orifice means may be formed in the outer peripheral surface of the valve member 38. The reference numeral 39 denotes a spring which is provided to enable the front end portion 23b of the poppet valve member 23 to be reliably seated on the valve seat 18d of the valve body 18.

As has been detailed above, according to the present invention, the orifices are opened and closed by closing the first valve portion with the poppet valve member and seating the second valve portion on the poppet valve member to thereby give the driver a feeling of stable and favorable braking. Accordingly, it is possible to obtain stable braking characteristics with a simple structure and also to improve the durability.

Although the present invention has been described through specific terms, it should be noted here that the described embodiments are not necessarily exclusive and various changes and modifications may be imparted thereto without departing from the scope of the invention which is limited solely by the appended claims.

What is claimed is:

1. A pneumatic booster comprising:
   a casing;
   a diaphragm secured to said casing to partition the inside of said casing into a front chamber which is communicated with a negative pressure source and a rear chamber;
   a valve body secured to the inner peripheral portion of said diaphragm;
   a vacuum valve having a first vacuum valve portion and a second vacuum valve portion provided in said valve body and movable relative to said first vacuum valve portion for mutual engagement and disengagement for selectively communicating and cutting off said front and rear chambers from each other;
   an atmospheric valve comprising a first atmospheric valve portion and a second atmospheric valve portion provided in said valve body and movable relative to said first atmospheric valve portion for mutual engagement and disengagement for selectively communicating and cutting off said rear chamber and atmosphere from each other;
   an input rod for actuating said vacuum valve and said atmospheric valve; and
   an output rod adapted to receive the force of displacement of said diaphragm;
   said atmospheric valve further having a third atmospheric portion provided in said valve body in series with and positioned along the path of movement of said first atmospheric valve portion relative to said second atmospheric valve portion for successive engagement of said first and third atmospheric valve portions and said first and second atmospheric valve portions during relative engaging movement along said path; and
   said atmospheric valve further has orifice means for providing communication between said rear chamber and the atmosphere during the period of time from the engagement between said first and third atmospheric valve portions until the engagement between said first and second atmospheric valve portions.

2. A pneumatic booster according to claim 1, wherein said valve body has an internal bore which extends axially, said input rod having one end thereof received in said bore, and said input rod being activated by being pressed from the outside of said cylinder, and further comprising a plunger disposed in said bore at a position forward of said input rod such that said plunger slides in response to the movement of said input shaft, said output rod being connected to said valve body in such a manner that said output rod faces said plunger endwise, and a poppet valve member disposed in said bore, said poppet valve member having said first vacuum valve portion thereon for being selectively separated from and seated on said second vacuum valve portion to cause said front and rear chambers to be communicated with and cut off from each other, and said poppet valve member also having said first atmospheric valve portion thereon for being separated from and seated on said second atmospheric valve portion to cause said rear chamber and the atmosphere to be communicated with and cut off from each other.

3. A pneumatic booster according to claim 2, wherein said poppet valve member moves relative to said second atmospheric valve portion during the period of time from the instant it closes said third atmospheric valve portion until it closes said second atmospheric valve portion.

4. A pneumatic booster according to claim 3, wherein said third atmospheric valve portion is on the outer periphery of the rear end portion of said plunger, and said second atmospheric valve portion is on a flange portion of said plunger which extends radially outward at a position forward of said rear end portion.

5. A pneumatic booster according to claim 4, wherein said first atmospheric valve portion on said poppet valve member is in sliding contact with said third atmospheric valve portion.

6. A pneumatic booster according to claim 5, wherein said orifice means is a groove extending axially in the inner peripheral portion of said poppet valve member.

7. A pneumatic booster according to claim 5, wherein said orifice means is a groove extending axially in the outer periphery of the rear end portion of said plunger.

8. A pneumatic booster according to claim 5, wherein said plunger has an internal bore which opens on said rear end portion, said orifice means being an orifice hole which extends radially through the peripheral wall of said internal bore at a position between said second and third atmospheric valve portions in the axial direction of said plunger.

9. A pneumatic booster according to claim 4, wherein a small clearance is provided between said poppet valve member and said third atmospheric valve portion, said clearance constituting said orifice means.

10. A pneumatic booster according to claim 3, wherein said plunger has a flange which extends radially outward from its rear end portion and a tubular portion which extends axially rearward from the outer peripheral portion of said flange, said third atmospheric valve portion being defined by a peripheral surface of said tubular portion, said second atmospheric valve portion being defined by the rear end face of said tubular portion, and said poppet valve member being in sliding contact with said third atmospheric valve portion.

11. A pneumatic booster according to claim 10, wherein said third atmospheric valve portion is defined by the outer peripheral surface of said tubular portion.

12. A pneumatic booster according to claim 11, wherein said orifice means is a groove extending axially in the outer peripheral surface of said tubular portion.

13. A pneumatic booster according to claim 11, wherein said poppet valve has an inner peripheral portion in sliding contact with said outer peripheral surface of said tubular portion, and said orifice means is a groove extending axially in said inner peripheral surface portion of said poppet valve member.

14. A pneumatic booster according to claim 10, wherein said third atmospheric valve portion is defined by the peripheral surface of said tubular portion, said poppet valve member having at its front end portion a tubular portion which is in sliding contact with the inner peripheral surface of the tubular portion of said plunger.

15. A pneumatic booster according to claim 14, wherein said orifice means is a groove extending axially in the inner peripheral surface of the tubular portion of said plunger.

16. A pneumatic booster according to claim 14, wherein said orifice means is a groove extending axially in the outer peripheral surface of the tubular portion of said poppet valve member.

17. A pneumatic booster according to claim 3, wherein said plunger has a flange which extends radially outward from its rear end portion and an annular projection which extends axially rearward from the outer peripheral portion of said flange, said pneumatic booster further comprising a tubular member which is biased toward said plunger for contacting the rear end face of said flange and being in sliding contact with the inner peripheral portion of said poppet valve member, said third atmospheric valve portion being defined by the outer peripheral surface of said tubular member, and said second atmospheric valve portion being defined by the end face of said annular projection.

18. A pneumatic booster according to claim 17, wherein said orifice means is a groove extending axially in the inner peripheral portion of said poppet valve member.

19. A pneumatic booster according to claim 17, wherein said orifice means is a groove extending axially in the outer peripheral surface of said tubular member.

* * * * *